M. N. CONNOR.
STUFFING BOX STRUCTURE FOR PUMPS AND THE LIKE.
APPLICATION FILED FEB. 20, 1914.

1,230,124.

Patented June 19, 1917.

Witnesses:
A. L. Lord.
C. H. Tresch.

Inventor.
Maurice N. Connor,
by B. W. Brockett
Atty.

UNITED STATES PATENT OFFICE.

MAURICE N. CONNOR, OF BUFFALO, NEW YORK, ASSIGNOR TO FRANK W. CARTER, OF BUFFALO, NEW YORK.

STUFFING-BOX STRUCTURE FOR PUMPS AND THE LIKE.

1,230,124.

Specification of Letters Patent.  Patented June 19, 1917.

Application filed February 20, 1914. Serial No. 819,901.

*To all whom it may concern:*

Be it known that I, MAURICE N. CONNOR, a citizen of the United States, residing at Buffalo, in the county of Erie and State of New York, have invented certain new and useful Improvements in Stuffing-Box Structures for Pumps and the like, of which the following is a specification.

This invention generally speaking relates to stuffing box structures, and particularly to that class of such devices utilized about a rotating shaft, such as the shaft of a rotary type of pump.

More specifically the invention relates to a stuffing box structure such as may be utilized about the shaft of a gear type of pump, and it comprises a casing having a packing recess surrounding the shaft, together with a gland nut arranged about the shaft in a manner such that it may engage the packing, together with a ball bearing structure arranged between the gland nut and the shaft.

The invention may be further briefly summarized as consisting in the construction and combination of parts hereinafter set forth in the following description, drawings and claims.

Figure 1:
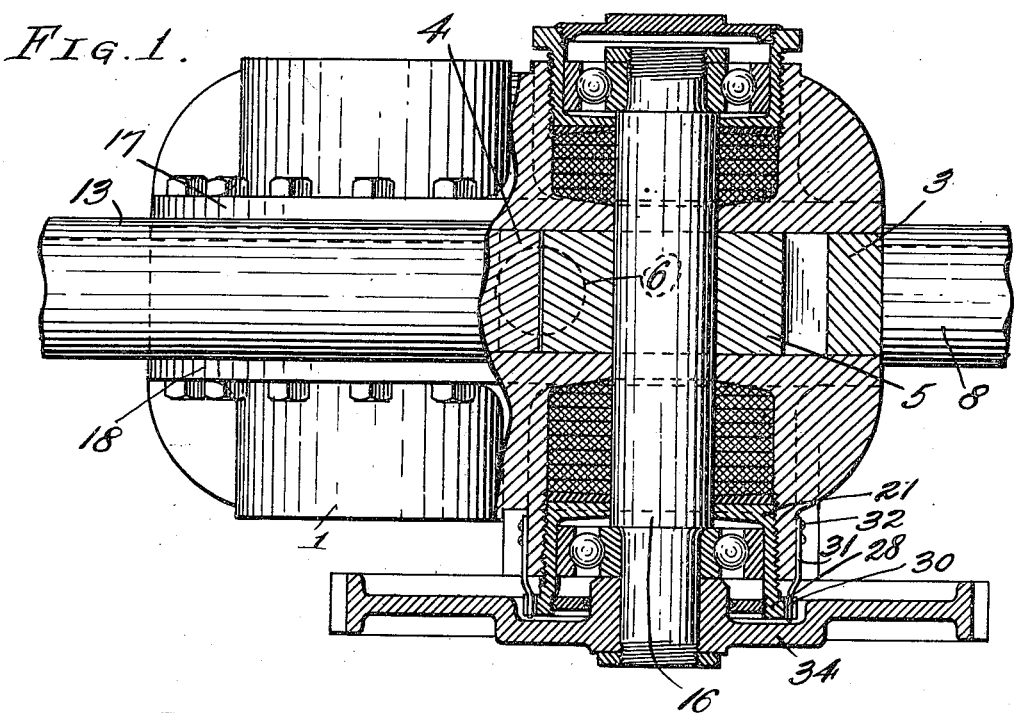
Figure 2:
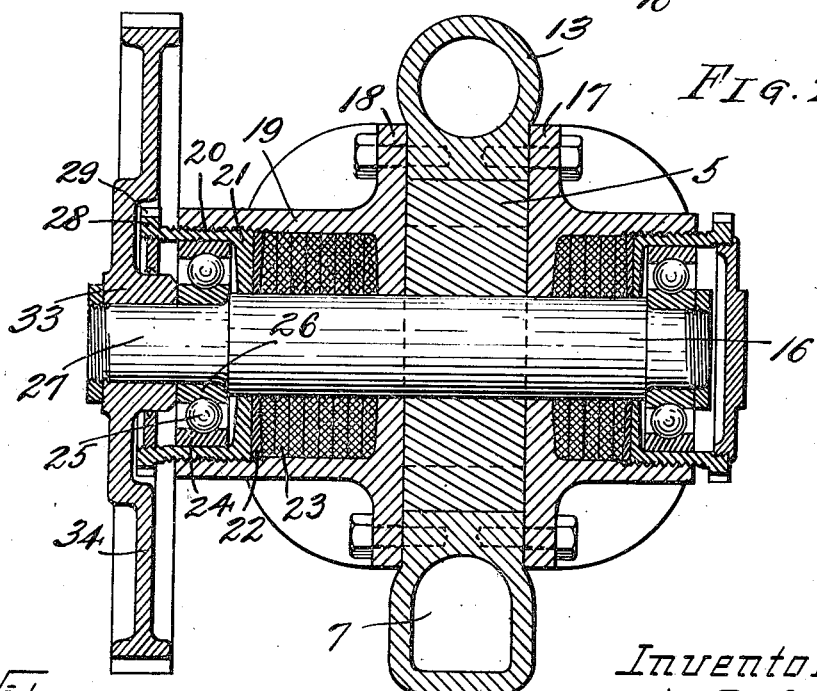

Referring to the drawings, Figure 1 is a view partly in plan and partly in horizontal section of a device embodying the invention; and Fig. 2 is a vertical section through the driving gear.

In carrying out the invention any preferred form and construction of parts may be employed so long as they possess the necessary characteristics, but I have shown one arrangement which is effective in operation, and in such embodiment 1 represents a suitable main pump casing which is provided with two cylinder portions, one of which is marked 3, arranged side by side and receiving two rotary pistons 4 and 5. These rotary pistons are in the form of gears with the teeth intermeshing as is common in devices of this character. The casing 1 is provided with an inlet 6 which communicates with a conduit 7 extending under the entire casing and communicating with suitable lateral discharge connections one of which is marked 8. The casing 1 also communicates by means of a suitable discharge opening with a transverse tubular discharge member 13. The rotary pistons are provided with similar shafts, one of which is marked 16, said shafts extending through openings in covers 17 and 18 and through suitable stuffing boxes in these covers, and since these stuffing boxes are of the same general structure, a description of one will suffice for all.

Each of the stuffing box structures comprises a cylindrical box 19 extending laterally from the cover member and concentric with the shaft with which it coöperates, and each of these boxes is internally threaded at 20 for receiving a gland nut 21 adapted to engage a washer 22 having a beveled face for engagement with suitable packing 23 arranged about the shaft. This nut receives snugly an external ball race 24 which engages ball bearings 25 arranged about an internal ball race or cone 26 forced on to a reduced portion 27 of the shaft. By this arrangement it will be seen that the gland ring may be tightened down upon the packing to overcome the leakage and at the same time the ball bearings will not be disturbed in any way and there will be no thrust against the external race as it will move freely within the ring 21. In order to hold the ring in any adjusted position it is provided with a flange 28 having recesses 29 cut in the periphery thereof and adapted to receive a suitable finger 30 forming a part of the leaf spring 31 secured to the box by suitable screws 32, as shown in Fig. 1.

The shaft 16, for driving the pump, has the reduced portion 27 at one end extended out, and it receives a hub 33 of a driving gear 34 meshing with any suitable driving gear, not shown, but which will be connected to any suitable source of power as to the propeller shaft of the motor vehicle upon which the pump may be mounted.

Having described my invention, I claim:—

1. In a combined bearing and stuffing box structure, a shaft, a casing having a packing recess surrounding said shaft, a gland nut arranged in said recess, and a ball bearing structure arranged between said nut and the shaft.

2. In a combined bearing and stuffing box structure, a shaft, a bearing support surrounding said shaft and having a cylindrical extension forming a packing recess, a gland nut engaging in said extension, packing arranged between said nut and said supporting member, a ball race fitted loosely within the nut, a ball race secured to the shaft, balls arranged between said races, and means for holding said gland nut in any adjusted position.

3. In a combined bearing and stuffing box structure, a shaft, a bearing supporting member surrounding said shaft, a cylindrical extension forming a part of said member and containing a packing recess, a gland nut threaded into said extension, packing arranged between said nut and said bearing supporting member, a ball race having a sliding fit within said nut, a ball race secured to the shaft, balls arranged between said races, and means for holding said nut in any adjusted position.

In testimony whereof I affix my signature in presence of two witnesses as follows.

MAURICE N. CONNOR.

Witnesses:
V. L. WHITEHEAD,
L. G. CARBERRY.